(No Model.)

J. W. WETMORE.
STAIRWAY TRUCK.

No. 269,248. Patented Dec. 19, 1882.

Witnesses
W. R. Edelen
Walter Scott

Inventor
Jerome W. Wetmore

UNITED STATES PATENT OFFICE.

JEROME W. WETMORE, OF ERIE, PENNSYLVANIA.

STAIRWAY-TRUCK.

SPECIFICATION forming part of Letters Patent No. 269,248, dated December 19, 1882.

Application filed April 17, 1882. (No model.)

*To all whom it may concern:*

Be it known that I, JEROME W. WETMORE, a citizen of the United States, residing at Erie, in the county of Erie and State of Pennsylvania, have invented a new and useful Stairway-Truck, of which the following is a specification.

My invention relates to improvements in stairway-trucks in which the legs or standards holding up the frame are jointed, hinged, or pivoted at their attachments to the main frame.

The objects of my improvement are to have the jointed legs or standards, when the handles are raised, advance by means of a spring onto the next step and the truck advanced by motion on the pivot or hinge, the foot of the standard resting on the step. I attain these objects by the mechanism illustrated in the accompanying drawings, in which—

Figure 1:
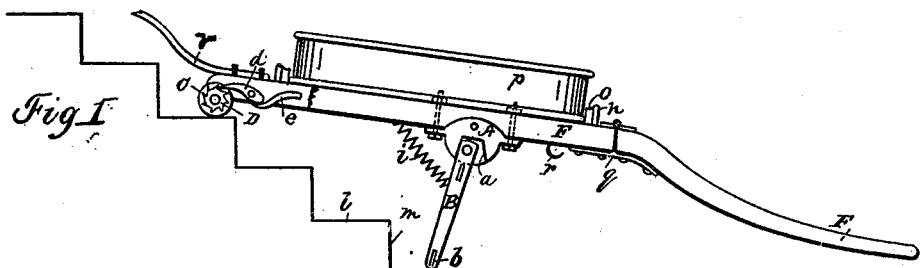
Figure 2:
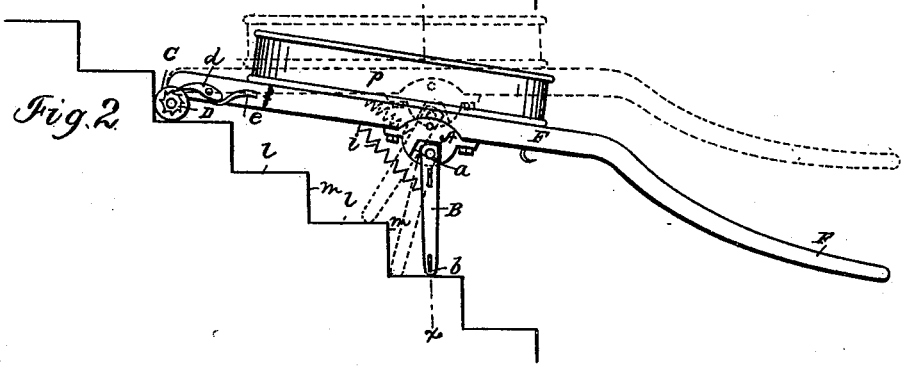
Figure 3:
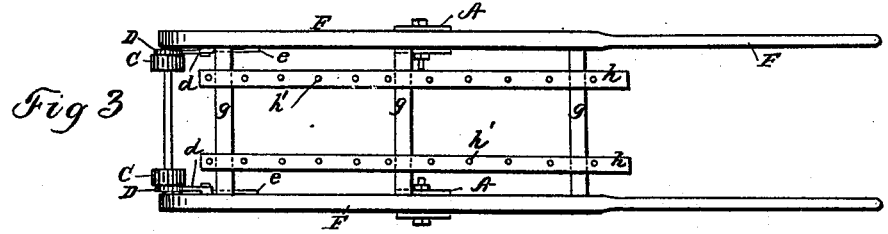
Figure 4:
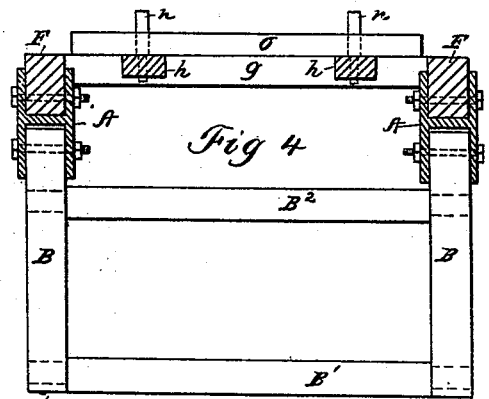
Figure 5:
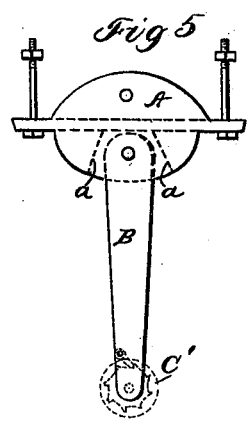
Figure 6:
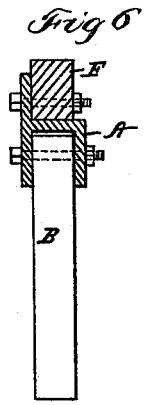

Figure 1 is a vertical section of a pair of stairs, and, in the main, a side view of the truck and its load; Fig. 2, the same view with the truck advanced and two new positions of the standard B assumed as the arms F are raised; Fig. 3, the vertical view of the truck; Fig. 4, vertical cross-section of the standards B through $x\ x$, Fig. 2; Fig. 5, enlarged side view of the standard B and its supporting-block A, Figs. 1 and 2; Fig. 6, partial section, like Fig. 4, showing a different construction of the mortised block A.

A is the supporting-block of the standard B. This is shown to be bolted onto F in Figs. 4, 5, and 6. $a$, Fig. 5, should be more at right angles to the line of F.

$u$ represents the oblique ends of the recess of A, in which the tenons of B are supported.

B is the main standard of the truck. It may be a parallelogram, as in Fig. 4, or cross-piece B' may be left out and the legs B B alone rest on the step.

C represents the wheels of the truck on a shaft running in bearings on F F.

D is the ratchet-wheel; $d$, ratchet, or pawl. D $d$ is a safety device to assist the operator in preventing a backward motion.

$e$ is a lever to lift the ratchet. This will be held down by any common catch on the side of F, so that when the truck is used on a level it can be run backward also.

F represents the sides and handles of the frame of the truck. The front side, Fig. 1, is broken away near letter $e$, so that the wheel, ratchet-wheel, and pawl on the opposite side are seen.

$g$ represents the cross-pieces of frame; $h$, bars on which the load rests, with holes $h'$ to hold the pins $n$ and stop $o$.

$i$ is the coil-spring. This will draw the standard B forward when the handles F are lifted and advance it, as shown by dotted lines, first to the rise $m$ and then onto the next step, $l$, until it strikes the side $a$ of the mortise. Other springs may be used for this purpose. The spring $i$ is detachable at its upper end, and is then attached to the hook $r$, Fig. 1. The purpose of this is to enable the truck to be used with or without a load to go down stairs. When so used the ratchet $d$ may be out of gear.

$o$ is a block to hold the load in place; $v$, detachable arms, locked in staples on the forward ends of F, Fig. 1. By these an assistant can help lift and draw the loaded truck.

$q$ represents joints, which may be made in F, Fig. 1, so that the handles may be turned up to allow the truck to be turned on a stairway-landing; $r$, hook to which the spring is fastened when the truck is used in going down stairs. The truck may be taken down stairs and used in carrying a load down as follows: The upper end of the spring $i$ is detached from the position represented and reattached to the hook $r$, Fig. 1. Then (the standard, left dotted line, resting on the third step from the right, Fig. 2) when the truck is drawn back, the pawl being out of the ratchet, wheel C will descend from the second step and rest on the third step, from the left, and when the handles F are then lifted the spring will draw the standard back onto the second step from the right.

$p$ is a load on the truck.

C' is a wheel and ratchet-wheel on the base of the standard. The right side of this, Fig.

5, is the front side. This wheel would be convenient for carrying with the truck on a level.

What I claim is—

1. The pivoted standard B, in combination with the spring $i$, substantially as described.

2. The spring $i$, detached from the frame F and attached to it behind B, for the purposes specified, substantially as described.

3. The hinged or movable arms $v$ and the hinged handles F on the truck, substantially as described, for the purpose specified.

4. The stairway-truck, when constructed with the standard, spring, ratchet-wheel, and pawl combined, substantially as described.

JEROME W. WETMORE.

Witnesses:
WM. P. HAYES,
WALTER SCOTT.